（12) United States Patent
Matthews et al.

(10) Patent No.: US 9,154,441 B2
(45) Date of Patent: Oct. 6, 2015

(54) ADAPTIVE BUFFER ALLOCATION MANAGEMENT (71) Applicant: Broadcom Corporation, Irvine, CA (US)

(72) Inventors: William Brad Matthews, San Jose, CA (US); Bruce Hui Kwan, Sunnyvale, CA (US)

(73) Assignee: BROADCOM CORPORATION, Irvine, CA (US)

( * ) Notice: Subject to any disclaimer, the term of this patent is extended or adjusted under 35 U.S.C. 154(b) by 52 days.

(21) Appl. No.: 13/798,481

(22) Filed: Mar. 13, 2013

(65) Prior Publication Data
US 2014/0211634 A1 Jul. 31, 2014

Related U.S. Application Data (60) Provisional application No. 61/756,866, filed on Jan. 25, 2013.

(51) Int. Cl.
G01R 31/08 (2006.01)
H04L 12/863 (2013.01)
H04L 12/835 (2013.01)

(52) U.S. Cl.
CPC .............. *H04L 47/6255* (2013.01); *H04L 47/30* (2013.01); *Y02B 60/31* (2013.01)

(58) Field of Classification Search
CPC ..... H04L 47/29; H04L 12/2854; H04L 47/10; H04L 12/2668; H04L 12/2671; H04L 12/2673; H04L 43/0876; H04L 43/0882; H04L 43/0888; H04L 67/2828
USPC ......... 370/203, 204–215, 229–240, 310–394, 370/395.1, 395.3, 395.4, 395.41, 395.42, 370/395.5, 395.52, 431–529, 523–520
See application file for complete search history.

(56) References Cited

U.S. PATENT DOCUMENTS

| | | | | |
|---|---|---|---|---|
| 6,501,757 B1* | 12/2002 | Kamaraj et al. | | 370/395.41 |
| 6,657,955 B1* | 12/2003 | Bonneau et al. | | 370/229 |
| 6,904,015 B1* | 6/2005 | Chen et al. | | 370/235 |
| 7,047,312 B1* | 5/2006 | Aweya et al. | | 709/235 |
| 7,734,808 B1* | 6/2010 | Bergamasco et al. | | 709/235 |
| 8,149,710 B2* | 4/2012 | Bergamasco et al. | | 370/235 |
| 8,593,955 B2* | 11/2013 | Yano et al. | | 370/230 |
| 8,792,352 B2* | 7/2014 | Bergamasco et al. | | 370/236 |
| 2002/0188648 A1* | 12/2002 | Aweya et al. | | 709/102 |
| 2006/0171318 A1* | 8/2006 | Bergamasco et al. | | 370/235 |
| 2009/0010162 A1* | 1/2009 | Bergamasco et al. | | 370/235 |
| 2011/0273983 A1* | 11/2011 | Bergamasco et al. | | 370/232 |
| 2012/0033550 A1* | 2/2012 | Yano et al. | | 370/230 |
| 2012/0207175 A1* | 8/2012 | Raman et al. | | 370/412 |
| 2013/0155850 A1* | 6/2013 | Chrysos et al. | | 370/230 |

* cited by examiner

*Primary Examiner* — Jung-Jen Liu
(74) *Attorney, Agent, or Firm* — Oblon, McClelland, Maier & Neustadt, L.L.P.

(57) ABSTRACT

Aspects of adaptive buffer allocation management are described. In one embodiment of adaptive buffer allocation management, data is received by a network component for communication to a network address. While awaiting transfer to the network address, the data must be stored or distributed to a buffer. In one embodiment, the data is distributed evenly about banks of the buffer when an amount of utilization of the buffer is low. In another embodiment, the data is distributed to certain banks of the buffer when the amount of utilization of the buffer is high. In other aspects, the amount of utilization of the buffer is monitored while data is distributed to the banks of the buffer, and the manner of data distribution among the banks is adapted based on the utilization. According to aspects of adaptive data distribution, a buffer of reduced size may be used.

20 Claims, 8 Drawing Sheets

ADAPTIVE BUFFER ALLOCATION MANAGEMENT

CROSS-REFERENCE TO RELATED APPLICATIONS

This application claims the benefit of U.S. Provisional Application No. 61/756,866, filed Jan. 25, 2013, the entire contents of which is hereby incorporated herein by reference.

BACKGROUND

A network component, such as a network switch, routes data from a source to a destination. For example, a network switch may receive network packets on one or more input ports and route these packets to one or more output ports. Packets entering the switch may be subject to scheduling according to packet priorities and network communications protocols. As packets are received by the switch for routing to one or more output ports, certain packets may need to be stored in a memory buffer. In some systems, the memory buffer size of a network component represents an important parameter for selection of the network component.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Aspects of adaptive buffer allocation management in a network component such as a network switch, for example, are described. In many network components, memory buffers are responsible for storing packet data and control information for at least a limited amount of time while the packet data is processed for transfer to another network component or destination. For certain network components, the amount of memory available in memory buffers represents an important parameter for selection of a network component in a system. That is, when designing a network, network engineers select certain components, at least in part, based upon an available buffer memory capacity. Because of the important role memory buffers play in network components, the cost and performance of network components may be improved in part by optimizing memory buffer architectures.

As part of a write operation, a memory buffer may be configured to receive and store data for an amount of time. In a read operation, the memory buffer may be configured to retrieve stored data. Under physical design constraints of certain memory buffers, a buffer may be limited to only a read or a write operation at any given time, regardless of the available capacity of the buffer. When used in network components, the use of memory buffers having such physical design constraints raises design considerations as further discussed below.

In the context described above, aspects of adaptive buffer allocation management are described herein. In one embodiment of adaptive buffer allocation management, data is received by a network component for communication to a network address. While awaiting transfer to the network address, the data must be stored or distributed to a buffer. In one embodiment, the data is distributed substantially evenly (or as evenly as possible) about banks of the buffer when an amount of utilization of the buffer is low. In another embodiment, the data is distributed to certain banks of the buffer when the amount of utilization of the buffer is high. In other aspects, the amount of utilization of the buffer is monitored while data is distributed to the banks of the buffer, and the manner of data distribution among the banks is adapted based on the utilization. According to aspects the of adaptive data distribution, a buffer of reduced size may be used.

Turning now to the drawings, a general description of exemplary embodiments of a network component is provided, followed by a discussion of the operation of the same.

Figure 1:
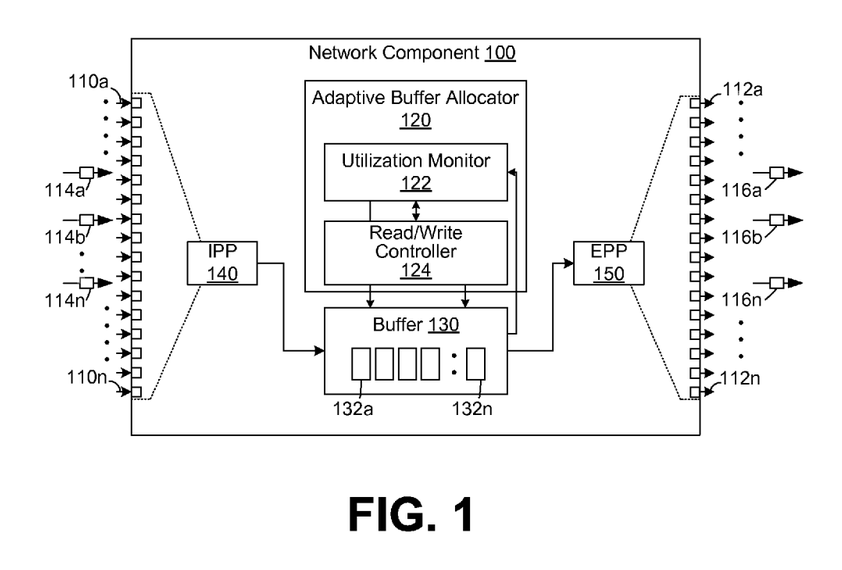
FIG. 1 illustrates an example network component according to certain aspects of embodiments described herein.

FIG. 1 illustrates an example network component 100 according to certain aspects of the embodiments described herein. The network component 100 may correspond to a switch, a router, a hub, a bridge, or any other similar network device. Generally, the network component is configured, among other things, to route and/or switch data packets among and between network components in a data network. In one aspect, the network component 100 is configured to receive one or more data packets from a network source and route and/or switch these packets to a network destination.

The network component 100 comprises one or more input or ingress ports 110a-110n and one or more output or egress ports 112a-112n. The network component 100 may receive data packets 114a-114n on any of the input ports 110a-110n. Further, the network component 100 may transmit data packets 116a-116n on any of the output ports 112a-112n. The network component 100 further comprises an ingress packet processor 140, an adaptive buffer allocator 120, a buffer 130, and an egress packet processor 150. The adaptive buffer allocator 120 comprises a utilization monitor 122 and a read/write controller 124, and the buffer 130 comprises a plurality of memory banks 132a-132n. Features and aspects of the elements of the network component 100 are described in further detail below.

Although a number of ports are illustrated in the example network component 100 of FIG. 1, the network component 100 may comprise a fewer or greater number of ports. Further, it should be appreciated that the network component 100 generally comprises other elements such as circuitry for rate control, packet inspection, data processing etc., and other supporting circuitry such as power supplies.

In certain aspects, the network component 100 controls traffic flow by receiving data packets 114a-114n via the input ports 110a-110n, determining a destination for the data packets based on header information, for example, of the data packets, and transmitting data packets 116a-116n via the output ports 112a-112n. In certain cases, while awaiting transfer to a destination network address, the received data packets 114a-114n must be stored or in the buffer 130. The buffer 130 may be relied upon by the network component 100 to store data packets awaiting further processing or distribution.

The ingress packet processor (IPP) 140 processes the data packets 114a-114n upon receipt by the network component 100. For example the IPP 140 may strip payload data from one or more of the data packets 114a-114n, and provide this payload data to the buffer 130 and/or the adaptive buffer allocator 120. Additionally, the IPP 140 may examine protocol headers associated with the data packets 114a-114n, to gather routing or other information for the network component 100. For example, the IPP 140 may be configured to examine Transmission Control Protocol/Internet Protocol (TCP/IP) or similar packet headers and provide certain routing information to the network component 100. The egress packet processor (EPP) 150 prepares data stored in the buffer 130 for outbound transmission via one or more of the output ports 112a-112n. For example, the EPP 150 may append header or other protocol information to payload data, so that it may be routed by other downstream network components.

Data from the received data packets 114a-114n is stored in the buffer 130 according to one or more write operations directed by the adaptive buffer allocator 120, as further described below. This data may read from the buffer 130 at a defined or variable rate for processing by the EPP 150 and distribution through the egress ports 112a-112n. In certain cases, if the ingress packet rate exceeds the processing rate of the network component 100, the occupancy of the buffer 130 increases over time. As the buffer 130 is of a limited size, packets received by the network component 100 may be lost by the network complement 100 if the buffer 130 is full. Especially when the buffer 130 is at a near-full condition, the risk for packet loss becomes high. If buffer occupancy (or utilization) becomes too high, the network component 100 may command a source of incoming packets to reduce the rate of packet transmission. For some applications, it is noted that network components with large buffer memories may be necessary for busy network systems.

In one general embodiment, the network component 100 comprises an output queued (OQ) network switch that employs a shared memory packet buffer design. In that context, the network component 100 maximizes packet burst absorption, minimizes delay, and offers a controllable Quality-of-Service (QoS) in packet switching. To achieve high buffer bandwidth and minimize delay in the network component 100, the buffer 130 is divided into banks 132a-132n. In one embodiment, each bank 132a-132n is accessible for either a data write operation or a data read operation. That is, each bank 132a-132n is accessible for either a data write or read operation, but cannot be simultaneously accessed for write and read operations. Read operations are generally given priority to avoid bandwidth loss, while write operations must be performed to any remaining non-reading bank having available capacity.

Figure 2A:
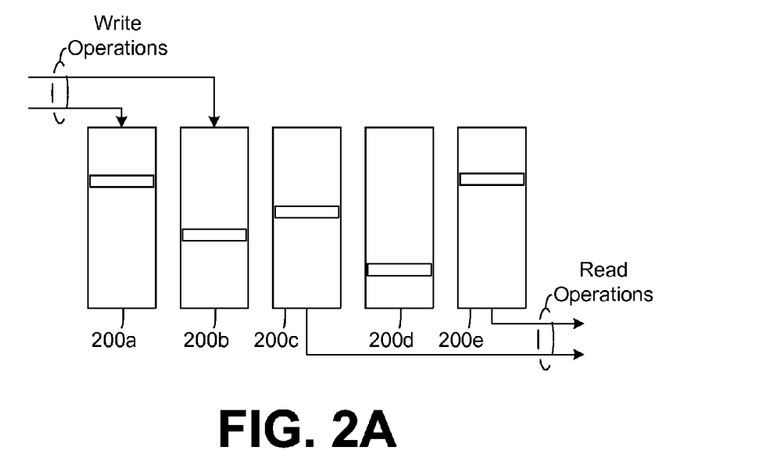
FIG. 2A illustrates example read and write operations on a buffer in a network component.

To better explain the concepts of read and write operations, FIG. 2A illustrates example read and write operations on a buffer in a network component. FIG. 2A illustrates banks 200a-200e, and write and read operations being performed on the banks. Specifically, bank 200a is occupied by a write operation, bank 200b is occupied by a write operation, bank 200c is occupied by a read operation, and bank 200e is occupied by a read operation. In FIG. 2A, the bank 200d is idle. The banks 200a-200e comprise single port memories. That is, each bank 200a-200e is accessible for either a data write or read operation, but cannot be accessed simultaneously for write and read operations. It is noted that, while dual port memories may be available, single port memories, such as the banks 200a-200e, are commonly selected for use in many network components because single port memories typically provide higher speed at lower cost and space requirements as compared to dual port memories.

Figure 2B:
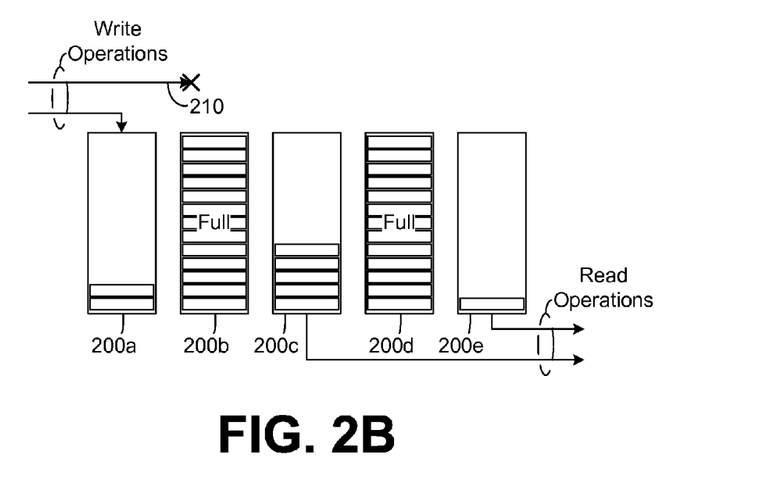
FIG. 2B illustrates an example conflict among read and write operations on the buffer of FIG. 2A.

FIG. 2B illustrates an example conflict among read and write operations on the buffer of FIG. 2A. In FIG. 2B, the banks 200b and 200d are full and are unavailable for write operations. Further, the banks 200c and 200e are occupied by read operations, and the bank 200a is occupied by a write operation. Thus, the write operation 210 cannot be completed, because no banks are available for the operation. In this case, data associated with one or more received packets may be dropped because the write operation 210 cannot be completed. This situation is unfavorable, especially considering the fact that banks 200a, 200c, and 200e are not full. In fact, for a customer operating a network component, it may be a point of frustration if write operations are lost although buffer or bank capacity is available. This is especially the case if the network component was advertised to operate with a certain buffer or bank capacity. Here, it is clear that the imbalance between the full banks 200b and 200d and the banks 200a, 200c, and 200e is a cause of the lost write operation 210. In other words, if some of the data that was stored in the bank 200b had been stored in the nearly-empty bank 200e, for example, the write operation 210 could have been performed on the bank 200b.

In the context of the lost write operation 210 of FIG. 2B, it is noted that most buffer reads are generally a random process in modern networks although, in some cases, being conditioned on certain scheduling disciplines, flow control events, etc. Imbalance among banks of a buffer can occur for various reasons such as imbalanced (i.e., several subsequent) write and/or read operations on one or a few banks of a buffer. Thus, if a certain bank is read from more often than others or if a certain bank is written to more often than others, for example, unexpected packet drops may occur due to write conflicts. These types of packet drops are especially problematic for network components that operate using certain protocols, such as Fiber Channel over Ethernet (FCoE) or Random Direct Memory Access (RDMA) over Converged Ethernet (RoCE) protocols, which depend heavily upon the integrity of every packet.

Figure 3:
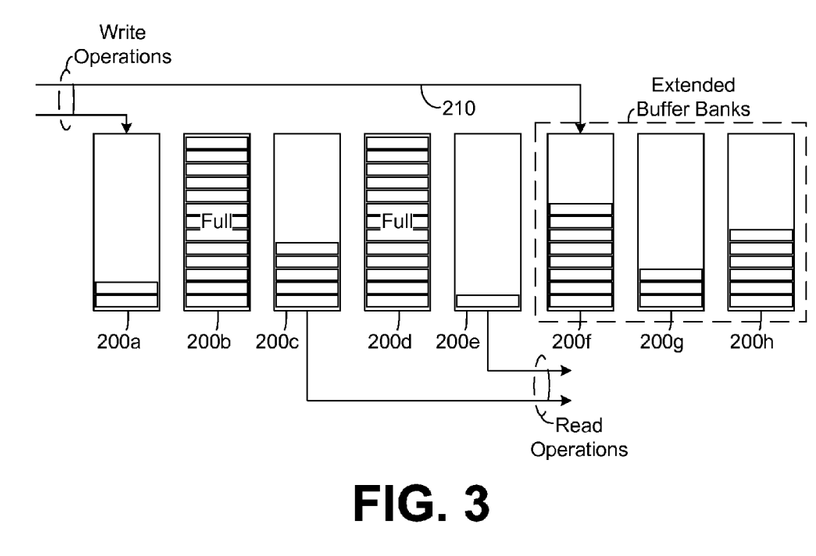
FIG. 3 illustrates example read and write operations on an extended buffer in a network component.

As one solution to the lost write operation 210 of FIG. 2B, FIG. 3 illustrates example read and write operations on an extended buffer in a network component. The extended buffer illustrated in FIG. 3 includes extended banks 200f, 200g, and 200h that are in addition to the banks 200a-200e illustrated in FIG. 2B. The extended banks 200f, 200g, and 200h ensure that the write operation 210 is completed, notwithstanding the fact that banks 200*b* and 200*d* are full, bank 200*a* is occupied by a write operation, and banks 200*c* and 200*e* are occupied by read operations. In one aspect of the extended buffer solution of FIG. 3, the number of extended banks necessary to prevent lost write operations is equal to the number of write sources plus the number of read sources, minus one. Thus, in the example of FIG. 3, 3 extended banks are required for the 2 sourced read operations and the 2 sourced right operations. The extended buffer including the 3 banks 200*f*, 200*g*, and 200*h* may be needed, in one aspect, to ensure that (at least) a full advertised buffer size is available, given the fact that an imbalance may occur among banks.

The use of an extended buffer, however, gives rise to other undesirable design problems. For example, an extended buffer only serves to add additional cost to network components. Further, the extended buffer leads to the necessity for additional circuitry that occupies space and power within network components. Thus, other embodiments described herein address the circumstances surrounding the above-described lost write operations, leading to dropped packets. In some aspects, the embodiments described herein seek to eliminate or reduce the need for extended buffers, thereby reducing the cost of network components while providing a substantially lower probability of packet loss.

Figure 4:
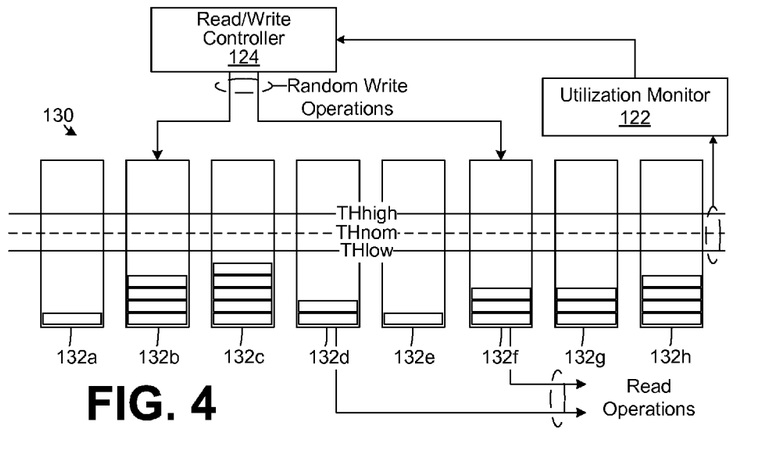
FIG. 4 illustrates example low utilization read and write operations on the buffer in the network component of FIG. 1 according to various embodiments described herein.

FIG. 4 illustrates example low utilization read and write operations on the buffer 130 in the network component 100 of FIG. 1 according to various embodiments described herein. In FIG. 4, banks 132*a*-132*h* of the buffer 130 (FIG. 1) are illustrated, each storing a relatively low amount of data. In this condition, the buffer 130 may be considered in a condition of low impact or low utilization. Various thresholds are also illustrated, including the high threshold THhigh, the nominal threshold THnom, and the low threshold THlow. The utilization monitor 122 of the network component 100 monitors each of the banks 132*a*-132*h* against the THhigh, THnom, and THlow thresholds, to monitor an amount of utilization of (i.e., an amount of data stored in) each of the banks 132*a*-132*h*.

According to aspects of the embodiments described herein, based on the amount of utilization of the banks 132*a*-132*h*, the read/write controller 124 of the network component 100 adaptively directs or controls read and write operations among the banks 132*a*-132*h* to reduce the probability of packet loss due to circumstances surrounding lost write operations. For example, the read/write controller 124 may distribute data write operations evenly about the banks 132*a*-132*h* when the amount of utilization of the banks 132*a*-132*h* is low, and distribute data write operations to certain ones of the banks 132*a*-132*h* when the amount of utilization the banks 132*a*-132*h* is high.

In various embodiments, utilization of the buffer 130 may be considered relatively high when one of the banks 132*a*-132*h* of the buffer 130 stores an amount of data that exceeds the THnom threshold. In another example, utilization of the buffer 130 may be considered high when at least a predetermined number of the banks 132*a*-132*h* of the buffer 130 store an amount of data greater than (or greater than or equal to) the THnom threshold, where the predetermined number is fixed by user-configuration of the network component 100 or assigned a factor of the total number of banks of the buffer, for example. Similarly, utilization of the buffer 130 may be considered relatively low when each of the banks 132*a*-132*h* of the buffer 130 store an amount of data less than (or less than or equal to) the THnom threshold. Other definitions of "high" and "low" buffer utilization are within the scope and spirit of the embodiments described herein, and some are described below. Further, the role and use of the high threshold THhigh and the low threshold THlow are described in further detail below.

Generally, during low utilization of the banks 132*a*-132*h* of the buffer 130 illustrated in FIG. 4, the read/write controller 124 directs write operations to be performed randomly about the banks 132*a*-132*h* of the buffer 130. In one embodiment, a random subset of K banks among banks 132*a*-132*h* is selected for write operations. The K banks may be used for write operations during low utilization of the buffer 130. Also, the random subset of K banks may be varied or re-selected over time in an attempt to maintain a relatively low utilization of each of the banks 132*a*-132*h* of the buffer 130. In this manner, the read/write controller 124 seeks to spread write operations evenly among the banks 132*a*-132*h*. By spreading data evenly among the banks 132*a*-132*h*, the chance of filling any particular bank may be reduced. This is desirable, at least because, as discussed above, full banks are one contributing factor in the circumstances surrounding lost write operations. Stated differently, one goal of the read/write controller 124 is to minimize skew or differences in an amount of data stored by respective ones of the banks in a buffer. For example, even if data packets corresponding to a large file are received in a sequence, data from those data packets may be distributed randomly among banks in a buffer to avoid skew.

Figure 5:
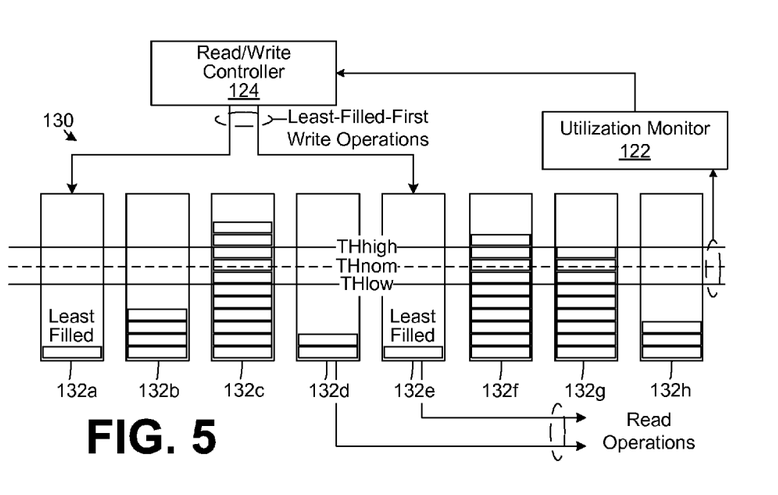
FIG. 5 illustrates example high utilization read and write operations on the buffer in the network component of FIG. 1 according to various embodiments described herein.

In contrast to the low utilization read and write operations and condition illustrated in FIG. 4, FIG. 5 illustrates example high utilization read and write operations on the buffer 130 in the network component 100 of FIG. 1 according to various embodiments described herein. In FIG. 4, banks 132*a*-132*h* of the buffer 130 (FIG. 1) are illustrated, with banks 132*c*, 132*f*, and 132*g* each storing a relatively high amount of data and banks 132*a*, 132*b*, 132*d*, 132*e*, and 132*h* each storing a relatively low amount of data. It is also noted that, as illustrated, banks 132*a* and 132*e* are each the "least filled" banks, because no other of the banks 132*a*-132*h* stores a lower amount of data. In this condition, the buffer 130 may be considered in a condition of high impact or high utilization. The THhigh, THnom, and THlow thresholds are also illustrated. Again, the utilization monitor 122 of the network component 100 monitors each of the banks 132*a*-132*h* against the THhigh, THnom, and THlow thresholds, to monitor the amount of utilization of each of the banks 132*a*-132*h*.

Because the banks 132*c*, 132*f*, and 132*g* exceed the THnom threshold, as identified by the utilization monitor 122, the read/write controller 124 seeks to distribute data write operations to certain banks in an effort to reduce skew among the banks 132*a*-132*h*. In other words, the read/write controller 124 seeks to distribute data write operations to banks in an effort to reduce the difference, for example, between the amounts of data stored in banks 132*a* and 132*c*. It is noted here that, even if data is randomly distributed when the buffer is in a low utilization state, as described above in connection with FIG. 4, the unbalanced or skewed conditions illustrated in FIG. 5 may occur. The unbalanced or skewed conditions may occur, for example, if several consecutive read operations occur on one bank, reducing the amount of data stored in that bank while also removing it's availability to have data written to it.

In various embodiments, utilization of the buffer 130 may be considered relatively high when one of the banks 132*a*-132*h* of the buffer 130 stores an amount of data that exceeds the THnom threshold. In another example, utilization of the buffer 130 may be considered high when at least a predetermined number of the banks 132*a*-132*h* of the buffer 130 store an amount of data greater than (or greater than or equal to) the THnom threshold, where the predetermined number is fixed by user-configuration of the network component 100.

Generally, for the high utilization of the banks 132a-132h of the buffer 130 illustrated in FIG. 5, the read/write controller 124 directs write operations to be performed in a manner that reduces skew about the banks 132a-132h of the buffer 130. In one embodiment, the read/write controller 124 directs write operations to be performed on least-filled buffers first. Thus, as illustrated in FIG. 5, write operations are being performed on the least-filled banks 132a and 132e. In this manner, the read/write controller 124 seeks to reduce the skew among the banks 132a-132h. By reducing the skew among the banks 132a-132h, the chance of filling any particular bank may be reduced.

Referring to FIGS. 4 and 5, it is clear that the network component 100 may operate in high and low impact or utilization conditions. It should be appreciated that, based on the control loop feedback provided by the utilization monitor 122, the read/write controller 124 is able to switch between random distribution and least-filled-first modes of write operation distribution over time. In one aspect, an amount of hysteresis is added to the control loop to prevent the read/write controller 124 from continuously switching between the modes of operation. In one embodiment, this hysteresis is implemented via reliance on the THhigh and THlow thresholds. In other embodiments, THighON and THighOFF thresholds, similar to the THhigh and THlow thresholds, may be relied upon to specify when high utilization or low utilization modes are active.

As a variation on the embodiment described above, utilization of the buffer 130 in FIG. 5 may be considered high when one of the banks 132a-132h of the buffer 130 stores an amount of data that exceeds the THhigh threshold. Alternatively, utilization of the buffer 130 may be considered relatively high when one of the banks 132a-132h of the buffer 130 stores an amount of data that exceeds the THhigh threshold. In another example, utilization of the buffer 130 may be considered high when at least a predetermined number of the banks 132a-132h of the buffer 130 store an amount of data greater than (or greater than or equal to) the THhigh threshold, where the predetermined number is fixed by user-configuration of the network component 100. Thus, if the THnom threshold is considered a "center" or "baseline" for discriminating whether utilization of a bank in the buffer 130 is low or high, use of the THhigh threshold provides an additional amount of headroom to that discrimination.

Thus, in one embodiment, utilization of a bank in the buffer 130 may not be considered to be high until is it at least a predetermined amount higher (e.g., THhigh) than the baseline threshold THnom. In such case, the read/write controller 124 may switch to the least-filled-first mode of write operation distribution illustrated in FIG. 5. When the THhigh and THlow thresholds are used together, a smooth control loop transition may be achieved between random distribution and least-filled-first modes of write operation distribution. In other embodiments, THighON and THighOFF thresholds, similar to the THhigh and THlow thresholds, may be relied upon to specify when high utilization or low utilization modes are active.

Figure 6:
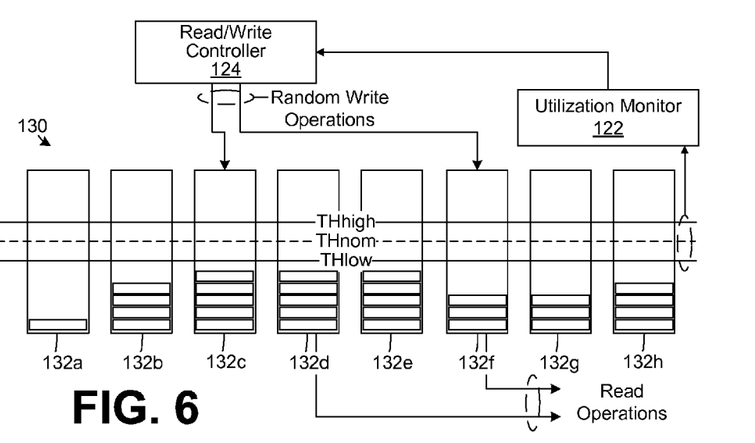
FIG. 6 illustrates example low utilization read and write operations after high utilization read and write operations in the network component of FIG. 1 according to various embodiments described herein.

FIG. 6 illustrates example low utilization read and write operations after high utilization read and write operations in the network component 100 of FIG. 1 according to various embodiments described herein. From the high utilization least-filled-first mode of write operation distribution illustrated in FIG. 5, FIG. 6 illustrates a transition to a low utilization random mode of write operation distribution. Here, utilization of the buffer 130 has transitioned to low utilization, because each of the banks 132a-132h of the buffer 130 now stores an amount of data that is less than the THlow threshold. Thus, in FIG. 6, the read/write controller 124 has adaptively switched from the least-filled-first mode of operation in FIG. 5 to the random distribution mode of write operation distribution adaptively based on the feedback provided by the utilization monitor 122.

In further variations on the embodiments discussed above, the utilization thresholds may be defined and monitored per bank of the buffer 130. That is, each of the banks 132a-132h may be assigned respective, and perhaps different, high, low, and nominal thresholds. These thresholds may be set by configuration of a user interface of the network component 100, for example. Additionally, as suggested above, changes between modes of operation may be based upon a certain number of banks storing data above or below the thresholds. In still another variation, the maximum difference between any two of the banks 132a-132h may be monitored by the utilization monitor 122, as discussed below in connection with FIG. 7.

Figure 7:
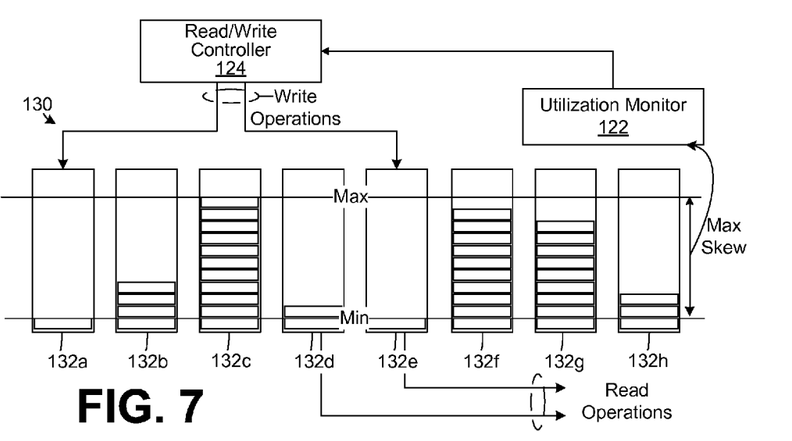
FIG. 7 illustrates an example skew calculation among banks of the buffer in the network component of FIG. 1 according to various embodiments described herein.

FIG. 7 illustrates an example skew calculation among banks of the buffer in the network component 100 of FIG. 1 according to various embodiments described herein. In FIG. 7, the utilization monitor 122 determines the maximum difference the banks 132a-132h of the buffer 130. As illustrated, the banks 132a and 132e store the least amount of data among the banks 132a-132h, and the bank 132c stores the most amount of data among the banks 132a-132h. The difference between the amount of data stored in the banks 132a and 132e and the bank 132c is measured or identified by the utilization monitor 122. In certain aspects, if the difference is greater than a predetermined bank skew difference threshold, the read/write controller 124 switches between modes of write operation distribution in an effort to address the skew. The utilization monitor 122 may also rely upon high, nominal, and low bank skew difference thresholds for hysteresis. As an alternative to determining the maximum skew difference, the utilization monitor 122 may determine an average skew difference between each of the banks 132a-132h.

In still other embodiments, the utilization monitor 122 may monitor use parameters of the banks 132a-132h of the buffer 130. The parameters may include one or more of average and peak bank skew, average or peak bank utilization, and average or peak buffer utilization. After a period of monitoring by the utilization monitor 122, data values of one or more of these parameters may be presented to a user for analysis. In some aspects, the network component 100 may perform an analysis of the parameters to set default conditions for adaptive switching between modes of operation, to arrive at further variations of the embodiments described above.

Through practice of the embodiments described above, certain benefits can be achieved. For example, space and power requirements of a network component can be reduced by reducing a size of a buffer relied upon by the component. Further, it is possible to reduce the probability that a network component operates in an unpredictable or undesirable state, such as when write operations and packets are lost.

Figure 8:
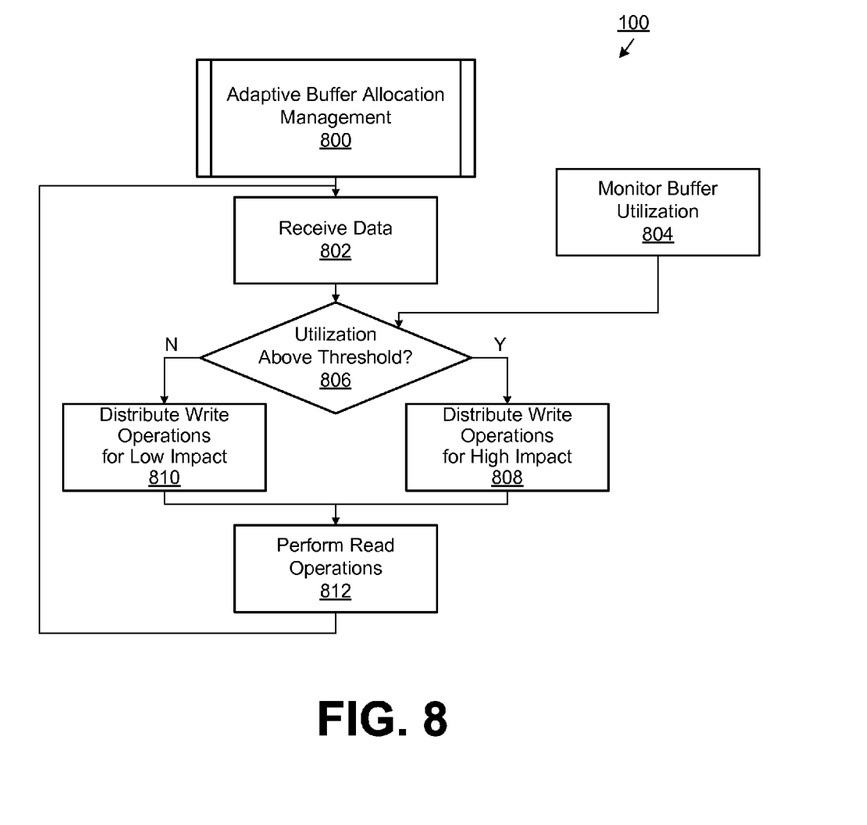
FIG. 8 illustrates an example process flow diagram of a process of adaptive buffer allocation management performed by the network component of FIG. 1 according to an example embodiment.
Figure 9:
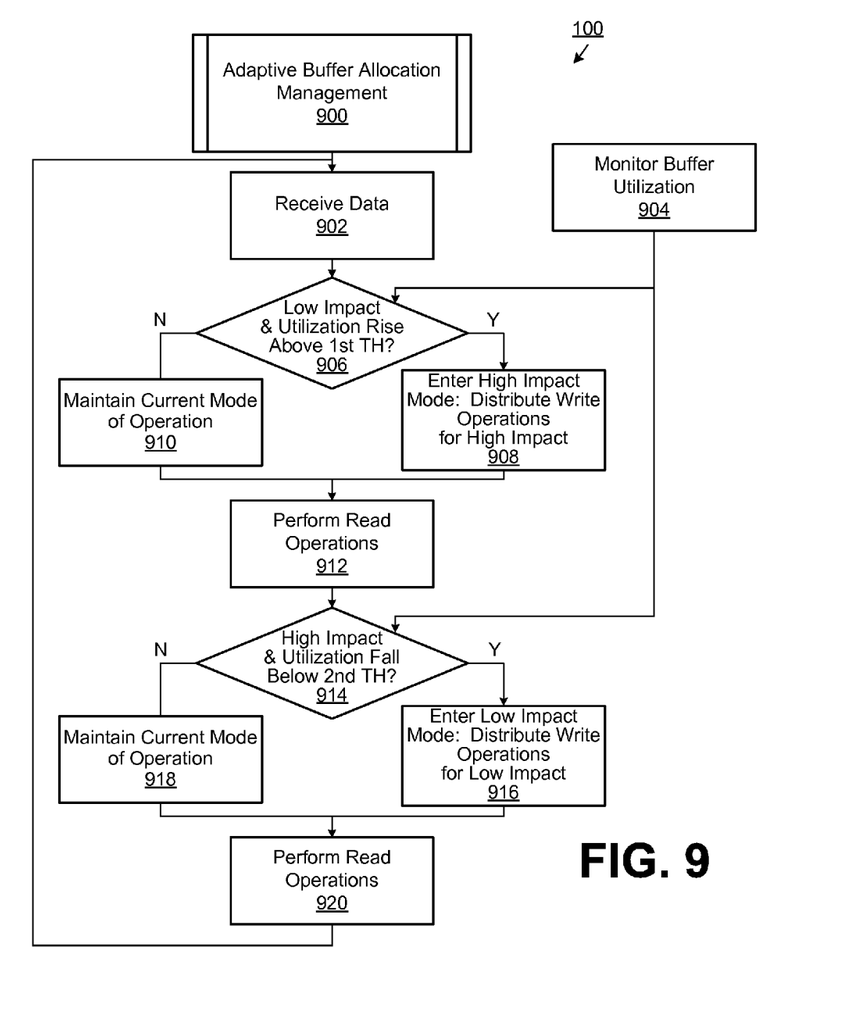
FIG. 9 illustrates another example process flow diagram of a process of adaptive buffer allocation management performed by the network component of FIG. 1 according to an example embodiment.

Referring next to FIGS. 8 and 9, flowcharts illustrating example operations of adaptive buffer allocation management are provided. In certain aspects, the flowcharts of FIGS. 8 and 9 may be viewed as depicting example steps of a method of adaptive buffer allocation management implemented by the network component 100 of FIG. 1. Although the processes of FIGS. 8 and 9 are described in connection with the network component 100 of FIG. 1, other network components may operate according to the processes illustrated. Further, it should be understood that the flowcharts of FIGS. 8 and 9 provide examples of different functional arrangements that may be employed according to the embodiments described herein.

FIG. 8 illustrates an example process flow diagram of a process of adaptive buffer allocation management 800 performed by the network component 100 of FIG. 1 according to an example embodiment. The process of adaptive buffer allocation management 800 begins at reference 802, where the network component 100 (FIG. 1) receives data. The data is received, for example, for switching to a network address by the network component 100. Meanwhile, and throughout the process 800, the utilization monitor 122 of the network component 100 monitors an amount of utilization of the buffer 130 at reference 804. Feedback from this monitoring at reference 804 is provided as input to reference 806, where the read/write controller 124 determines whether utilization of the data buffer 130 is above a threshold. For example, the utilization monitor 122 may monitor an amount of utilization of the buffer 130 at reference 804 and, if the utilization is above a nominal threshold, indicate to the read/write controller 124 that utilization of the data buffer 130 is above the nominal threshold.

Based on the determination at reference 806, the read/write controller 124 either distributes the data received at reference 802 evenly about banks of the buffer 130 at reference 810 in a low utilization mode of operation, or distributes the data received at reference 802 to certain banks of the buffer 130 at reference 808 in a high utilization mode of operation. Specifically, the read/write controller 124 distributes the data received at reference 802 evenly about banks of the buffer 130 at reference 810 in a low utilization mode of operation when the amount of utilization is determined to be high at reference 806. Alternatively, the read/write controller 124 distributes the data received at reference 802 to certain banks of the buffer 130 at reference 808 in a high utilization mode of operation when the amount of utilization is determined to be high at reference 806. At reference 812, any read operations are performed using the buffer 130 by the read/write controller 124, and the process 800 returns to reference 802 for the receipt of any incoming data.

It is noted that, distributing the data evenly about banks of the buffer 130 at reference 810 comprises, in one embodiment, writing data to banks of the buffer 130 randomly. Further, distributing the data to certain banks of the buffer 130 at reference 808 comprises, in one embodiment, writing data to banks of the buffer 130 having a lowest distribution of data (e.g., least-filled banks) when the amount of utilization is high. Also, monitoring an amount of utilization of the buffer 130 at reference 804 may comprise determining whether a predefined number of banks of the buffer 130 store more than a threshold amount of data. Alternatively, monitoring an amount of utilization of the buffer 130 at reference 804 may comprise determining a maximum amount of data storage skew between any two banks of the buffer 130 or an average amount of data storage skew between banks of the buffer 130.

FIG. 9 illustrates another example process flow diagram of a process of adaptive buffer allocation management 900 performed by the network component 100 of FIG. 1 according to an example embodiment. The process of adaptive buffer allocation management 900 begins at reference 902, where the network component 100 (FIG. 1) receives data. Meanwhile, and throughout the process 900, the utilization monitor 122 of the network component 100 monitors an amount of utilization of the buffer 130 at reference 904. Feedback from this monitoring at reference 904 is provided as input for the processes at references 906 and 914, where the read/write controller 124 determines whether the current mode of operation is low impact or high impact. The read/write controller 124 also determines at references 906 and 914 whether the utilization of the data buffer 130 rises above a first threshold or falls below a second threshold. In this context, the utilization monitor 122 also monitors an amount of utilization of the buffer 130 at reference 904 and indicates to the read/write controller 124 whether utilization of the data buffer 130 rises above the first or falls below the second threshold.

In connection with FIG. 9, it is noted that the current mode of operation may be considered to be "high impact" when the buffer 130 includes at least one bank that stores a relatively high amount of data. For example, in a high impact mode, one or more banks of the buffer 130 may be nearly full. Alternatively, the current mode of operation may be considered to be "low impact" when the buffer 130 includes banks that store a relatively low amount of data. For example, in a low impact mode, one or more banks of the buffer 130 may be nearly empty. It should be appreciated, however, that these examples of "high" and "low" impact utilization are provided by way of example only, as other relative levels of data storage in the buffer 130 lead to different "high" and "low" impact modes of operation. In the same context, the current mode of operation may be considered to be "high impact" or "low impact" depending upon whether the read/write controller 124 is currently performing write operations to certain banks of the buffer 130, in an effort to reduce skew (e.g., "high impact"), or the read/write controller 124 is currently performing write operations substantially evenly among the banks of the buffer 130 (e.g., "low impact").

Based on the determination at reference 906, the read/write controller 124 either maintains its current mode of operation at reference 910, or enters a high impact or utilization mode and distributes the data received at reference 902 to certain banks of the buffer 130 at reference 908. As one example, the read/write controller 124 may distribute the data received at reference 902 to certain banks of the buffer 130 at reference 908 in a high impact or utilization mode of operation when the amount of utilization is determined to be greater than or equal to the high threshold at reference 906. At reference 912, any read operations are performed by the read/write controller 124 using the buffer 130.

At reference 914, by the read/write controller 124 determines whether the current mode of operation is high impact and the utilization of the data buffer 130 is below a second threshold. For example, the utilization monitor 122 may monitor an amount of utilization of the buffer 130 at reference 904 and, if the utilization is below a low threshold, indicate to by the read/write controller 124 at reference 914 that utilization of the data buffer 130 is below the low threshold.

Based on the determination at reference 914, the read/write controller 124 either maintains its current mode of operation at reference 918, or enters a low impact or utilization mode and distributes the data received at reference 902 to certain banks of the buffer 130 at reference 916. For example, the read/write controller 124 distributes the data received at reference 916 to certain banks of the buffer 130 at reference 908 in a low impact or utilization mode of operation when the amount of utilization is determined to be less than or equal to the low threshold at reference 914. At reference 920, any read operations are performed by the read/write controller 124 using the buffer 130, and the process 900 returns to reference 902 for the receipt of any incoming data.

It is noted that, distributing the data at reference 908 comprises, in one embodiment, writing data to banks of the buffer 130 having a lowest distribution of data (e.g., least-filled banks). Further, distributing the data at reference 916 comprises, in one embodiment, writing data to banks of the buffer 130 randomly or substantially evenly. Also, monitoring an amount of utilization of the buffer 130 at reference 904 may comprise determining whether a predefined number of banks of the buffer 130 store more than a threshold amount of data. Alternatively, monitoring an amount of utilization of the buffer 130 at reference 904 may comprise determining a maximum amount of data storage skew between any two banks of the buffer 130 or an average amount of data storage skew between banks of the buffer 130.

Figure 10:
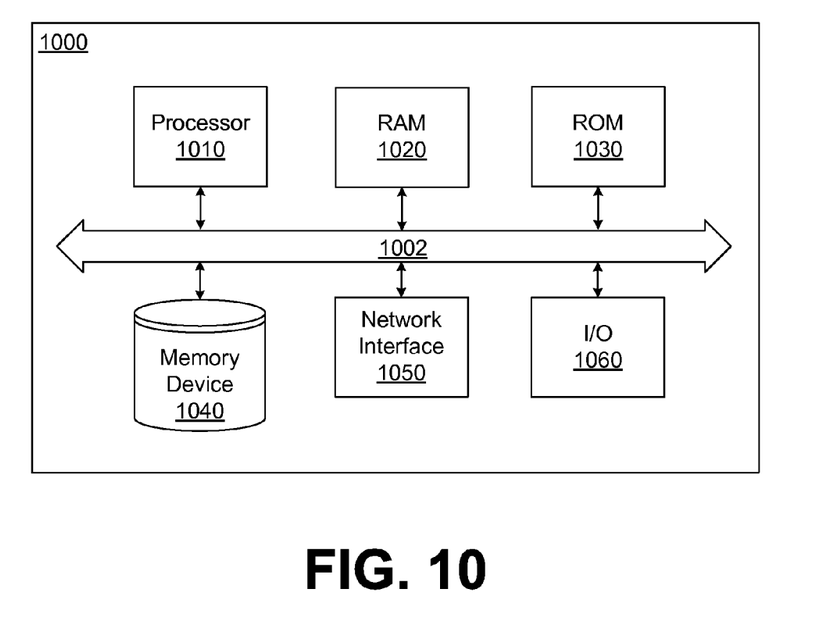
FIG. 10 illustrates an example schematic block diagram of a computing environment that may be employed in the by the combination structure of FIG. 2 or the edge smoothing block filter of FIG. 3 according to various embodiments described herein.

FIG. 10 illustrates an example schematic block diagram of a computing device 100 that may be employed by the network component 100 of FIG. 1 according to various embodiments described herein.

The computing device 1000 may be embodied, in part, using one or more elements of a general purpose computer. The computing device 1000 includes a processor 1010, a Random Access Memory ("RAM") 1020, a Read Only Memory ("ROM") 1030, a memory device 1040, a network interface 1050, and an Input Output ("I/O") interface 1060. The elements of computing device 1000 are communicatively coupled via a bus 1002. The elements of the computing device 1000 are not intended to be limiting in nature, as the device may further include other elements.

In various embodiments, the processor 1010 may comprise any well-known general purpose arithmetic processor, state machine, or Application Specific Integrated Circuit ("ASIC"), for example. In one embodiment, incoming packets, such as those packets received by the input ports 110a-110 (FIG. 1), are processed by the processor 1010. Further the adaptive buffer allocator 120 may be implemented, in part, by the processor 1010. The processor 1010 may include one or more circuits, one or more microprocessors, ASICs, dedicated hardware, or any combination thereof. In certain aspects embodiments, the processor 1010 is configured to execute one or more software modules. The processor 1010 may further include memory configured to store instructions and/or code to various functions, as further described herein. In certain embodiments, the processor 1010 may comprise a state machine or ASIC, and the processes described in FIGS. 8 and 9 may be implemented or executed by the state machine or ASIC according to a specialized or embedded circuitry design, by firmware, or a combination of a circuitry and firmware.

The RAM and ROM 1020 and 1030 comprise any well-known random access and read only memory devices that store computer-readable instructions to be executed by the processor 1010. The memory device 1040 stores computer-readable instructions thereon that, when executed by the processor 1010, direct the processor 1010 to execute various aspects of the embodiments described herein.

As a non-limiting example group, the memory device 1040 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1050 comprises hardware interfaces to communicate over data networks. The I/O interface 1060 comprises device input and output interfaces such as keyboard, pointing device, display, communication, and/or other interfaces. The bus 1002 electrically and communicatively couples the processor 1010, the RAM 1020, the ROM 1030, the memory device 1040, the network interface 1050, and the I/O interface 1060, so that data and instructions may be communicated among them.

In certain aspects, the processor 1010 is configured to retrieve computer-readable instructions and data stored on the memory device 1040, the RAM 1020, the ROM 1030, and/or other storage means, and copy the computer-readable instructions to the RAM 1020 or the ROM 1030 for execution, for example. The processor 1010 is further configured to execute the computer-readable instructions to implement various aspects and features of the embodiments described herein. For example, the processor 1010 may be adapted or configured to execute the processes described above with reference to FIGS. 8 and 9. In embodiments where the processor 1010 comprises a state machine or ASIC, the processor 1010 may include internal memory and registers for maintenance of data being processed.

The flowcharts or process diagrams of FIGS. 8 and 9 are representative of certain processes, functionality, and operations of embodiments discussed herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 1010. The machine code may be converted from the source code, etc. Further, each block may represent, or be connected with, a circuit or a number of interconnected circuits to implement a certain logical function or process step.

Although the flowcharts or process diagrams of FIGS. 8 and 9 illustrate an order, it is understood that the order may differ from that which is depicted. For example, an order of execution of two or more blocks may be scrambled relative to the order shown. Also, two or more blocks shown in succession in FIGS. 8 and 9 may be executed concurrently or with partial concurrence. Further, in some embodiments, one or more of the blocks shown in FIGS. 8 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method of adaptive buffer allocation management, comprising:
receiving data for switching to a network address;
determining, by a utilization monitoring circuit for a buffer that includes a plurality of banks, a capacity utilization amount of each bank of the plurality of banks;
determining, by the utilization monitoring circuit, whether a capacity utilization amount of one of the banks has exceeded a first threshold by comparing each capacity utilization amount to the first threshold;
distributing, in a low impact mode, the data to any bank of the plurality of banks of the buffer when the utilization monitoring circuit determines that each capacity utilization amount of the plurality of banks is below the first threshold;

distributing, in a high impact mode, the data to specific banks of the buffer in which the capacity utilization amount is below the first threshold when the utilization monitoring circuit determines that the capacity utilization amount of one of the banks has exceeded the first threshold;

performing a read operation on the buffer;

determining, by the utilization monitoring circuit, whether the data was distributed in the high impact mode and whether the capacity utilization amount of the banks is below a second threshold; and enabling the low impact mode when the utilization monitoring circuit determines that the data was distributed in the high impact mode and that the capacity utilization amount of the banks is below the second threshold.

2. The method of claim 1, wherein distributing the data to any bank of the plurality of banks of the buffer and distributing the data to specific banks of the buffer comprises writing data to banks of the buffer in one or more write operations, and performing the read operation on the buffer comprises reading data from the buffer for transmission.

3. The method of claim 1, wherein distributing the data to any bank of the plurality of banks of the buffer comprises writing data to any of the banks of the buffer when the capacity utilization amount is below the first threshold.

4. The method of claim 1, wherein distributing the data to specific banks of the buffer comprises writing data to banks of the buffer having a lowest distribution of data when the capacity utilization amount of one of the banks is above the first threshold.

5. The method of claim 1, wherein determining the capacity utilization amount of the buffer comprises determining whether a predefined number of banks of the buffer store an amount of data that is more than the first threshold.

6. The method of claim 1, wherein determining the capacity utilization amount of the buffer further comprises determining a maximum amount of data storage skew between any two banks of the buffer.

7. The method of claim 1, wherein determining the capacity utilization amount of the buffer comprises determining an average amount of data storage skew between banks of the buffer.

8. The method of claim 1, wherein the specific banks of the buffer have a capacity utilization amount that is less than the first threshold.

9. The method of claim 8, wherein the determining whether the capacity utilization amount of the banks is below the second threshold further includes determining whether the capacity utilization amount of the banks is greater than the first threshold, and the distributing of the data to any bank of the buffer comprises distributing the data to any bank of the buffer when the capacity utilization amount of each of the banks is less than the second threshold.

10. A computing device for adaptive buffer allocation management, comprising:

an ingress port that receives data for switching to a network address;

a utilization monitoring circuit that monitors an capacity utilization amount of a buffer that includes a plurality of banks and determines whether the capacity utilization amount of one of the banks has exceeded a first threshold by comparing each capacity utilization amount to the first threshold; and a controlling circuit that distributes data, in a low impact mode, to any bank of the buffer when the utilization monitoring circuit determines that each capacity utilization amount of the plurality of banks is below the first threshold, distributes the data, in a high impact mode, to specific banks of the buffer in which the capacity utilization amount is below the first threshold when the utilization monitoring circuit determines that the capacity utilization amount of one of the banks has exceeded the first threshold, and performs a read operation on the buffer, wherein the utilization monitoring circuit further determines whether the data was distributed in the high impact mode and whether the capacity utilization amount of the banks is below a second threshold, and the controlling circuit enables the low impact mode when the utilization monitoring circuit determines that the data was distributed in the high impact mode and that the capacity utilization amount of the banks is below the second threshold.

11. The device of claim 10, wherein the controlling circuit further distributes data to banks of the buffer having a lowest distribution of data when the capacity utilization amount of one of the banks is above the first threshold.

12. The device of claim 10, wherein the utilization monitoring circuit further determines whether a predefined number of banks of the buffer store an amount of data that is more than the first threshold.

13. The device of claim 10, wherein the utilization monitoring circuit further determines a maximum amount of data storage skew between any two banks of the buffer.

14. The device of claim 10, wherein the utilization monitoring circuit further determines an average amount of data storage skew between banks of the buffer.

15. The device of claim 10, wherein the specific banks of the buffer have a capacity utilization amount that is less than the first threshold.

16. The device of claim 15, wherein the utilization monitoring circuit further determines whether the capacity utilization amount of the banks is below the second threshold and is greater than the first threshold, and the controlling circuit further distributes the data evenly between each the banks of the buffer when the capacity utilization amount is less than the second threshold and greater than the first threshold.

17. A method of adaptive buffer allocation management, comprising:

receiving, by an ingress port, data for switching to a network address;

determining, by a utilization monitoring circuit, whether a predefined number of banks of a plurality of banks of a buffer store more than a first threshold amount of data;

writing data, by a control circuit in a low impact mode, to any of the banks of the buffer when the predefined number of banks do not store more than the first threshold amount of data;

writing data, by the control circuit in a high impact mode to specific banks of the buffer that have a lowest capacity utilization amount when the predefined number of banks store more than the first threshold amount of data;

reading data, by the control circuit, from the buffer, determining, by the utilization monitoring circuit, whether the control circuit wrote data the high impact mode and whether the predefined number of banks store more than a second threshold amount of data; and enabling, by the control circuit, the low impact mode when the utilization monitoring circuit determines that the control circuit wrote data in the high impact mode and that the predefined number of banks store more than the second threshold amount of data.

18. The method of claim 17, wherein writing data to any of the banks of the buffer comprises writing, by the control circuit, the data to any of the banks of the buffer when the capacity utilization amount of the predefined number of banks is greater than the first threshold, and writing data to the specific banks of the buffer comprises writing data to the specific banks of the buffer that have a lowest distribution of data when the capacity utilization amount of the predefined number of banks less than the second threshold.

19. The method according to claim 17, wherein determining whether the predefined number of banks store more than the first threshold amount of data further comprises determining, by the utilization monitoring circuit, a maximum amount of data storage skew between any two banks of the buffer.

20. The method according to claim 17, wherein determining whether the predefined number of banks store more than the first threshold amount of data further comprises determining an average amount of data storage skew between banks of the buffer.

* * * * *